(12) United States Patent
Yun et al.

(10) Patent No.: US 12,365,391 B2
(45) Date of Patent: Jul. 22, 2025

(54) PANEL ASSEMBLY FOR VEHICLE

(71) Applicants: Hyundai Motor Company, Seoul (KR); Kia Corporation, Seoul (KR)

(72) Inventors: Hyun Cheol Yun, Seoul (KR); Doo Young Jung, Suwon-si (KR); Sun Hyung Cho, Suwon-si (KR); Min Soo Kim, Suwon-si (KR); Jin Young Mo, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 281 days.

(21) Appl. No.: 17/977,394

(22) Filed: Oct. 31, 2022

(65) Prior Publication Data

US 2023/0278635 A1    Sep. 7, 2023

(30) Foreign Application Priority Data

Mar. 7, 2022 (KR) .................. 10-2022-0028821

(51) Int. Cl.
| | | |
|---|---|---|
| *B62D 25/02* | (2006.01) | |
| *B60R 7/02* | (2006.01) | |
| *B62D 25/08* | (2006.01) | |
| *B62D 25/12* | (2006.01) | |
| *B62D 33/04* | (2006.01) | |

(52) U.S. Cl.
CPC .............. *B62D 25/02* (2013.01); *B60R 7/02* (2013.01); *B62D 25/087* (2013.01); *B62D 25/12* (2013.01); *B62D 33/04* (2013.01)

(58) Field of Classification Search
CPC ........ B62D 33/04; B62D 25/02; B62D 21/08; B62D 25/12; B62D 63/025; B62D 25/087; B62D 25/24; B60R 7/02; B60R 7/08; B60P 3/007; B60P 3/00
See application file for complete search history.

(56) References Cited

U.S. PATENT DOCUMENTS

| | | | |
|---|---|---|---|
| 4,821,394 A * | 4/1989 | Martinez-Vera | B60J 7/106 296/218 |
| 2016/0129943 A1 | 5/2016 | Tsukimori | |
| 2019/0033883 A1* | 1/2019 | Ferguson | G06Q 10/06315 |
| 2021/0094506 A1* | 4/2021 | Baker | B60R 25/241 |
| 2023/0173987 A1* | 6/2023 | Jung | B62D 63/025 224/42.13 |
| 2023/0182822 A1* | 6/2023 | Yun | B62D 27/023 296/191 |

(Continued)

FOREIGN PATENT DOCUMENTS

| | | | | |
|---|---|---|---|---|
| CN | 214215576 U | * | 9/2021 | ........... B62D 63/025 |
| KR | 20160003186 A | | 1/2016 | |

*Primary Examiner* — Daniel J Colilla
(74) *Attorney, Agent, or Firm* — Slater Matsil, LLP

(57) ABSTRACT

An embodiment panel assembly for a vehicle is provided. The vehicle includes a vehicle body that includes a plurality of pipes and also includes an upper body coupled to a lower body, and the panel assembly includes an inner panel fastened to the vehicle body and connected to luggage housings of luggage boxes disposed in the upper body of the vehicle body, the luggage boxes each having an opening open to a side of the vehicle and a luggage door configured to cover the opening, and an outer panel fastened to the inner panel from an outside, defining an exterior of the vehicle, and connected to the luggage housings of the luggage boxes.

20 Claims, 7 Drawing Sheets

(56) References Cited

U.S. PATENT DOCUMENTS

2023/0249765 A1\* 8/2023 Gim .................... B62D 27/023
                                                    296/193.04
2023/0360535 A1\* 11/2023 Johnson .................. G08G 1/20

\* cited by examiner

PANEL ASSEMBLY FOR VEHICLE

CROSS-REFERENCE TO RELATED APPLICATIONS

This application claims the benefit of Korean Patent Application No. 10-2022-0028821, filed on Mar. 7, 2022, which application is hereby incorporated herein by reference.

TECHNICAL FIELD

The present disclosure relates generally to a technology for a panel assembly.

BACKGROUND

A general vehicle body structure is fabricated by processing and welding components by pressing using a die. For this reason, there may be a problem in that the vehicle body structure may require large-scale facility investment for a pressing factory, a vehicle body welding plant, and a painting plant, as well as suffering from a low degree of freedom of design.

In particular, there may be a problem in that an existing vehicle body may require a large amount of design changes during small quantity batch production, and accordingly, the number of dies may also be drastically increased, which inevitably increases manufacturing costs.

In order to timely cope with a market environment and customer needs that have changed rapidly in recent times, it is necessary to simplify vehicle production and minimize a vehicle development period.

Accordingly, there is demand for a vehicle body structure which can cope with various designs and which improves ease of assembly of the vehicle body in a smart factory environment.

The foregoing is intended merely to aid in the understanding of the background of embodiments of the present disclosure, and is not intended to mean that the present disclosure falls within the purview of the related art that is already known to those skilled in the art.

SUMMARY

The present disclosure relates generally to a technology for a panel assembly. Particular embodiments relate to a technology for an inner panel assembly which is coupled to an upper body for a vehicle body and to which an outer panel is externally coupled.

Accordingly, embodiments of the present disclosure can solve problems occurring in the related art, and an embodiment of the present disclosure provides an inner panel assembly of an upper body for a vehicle, in which, in a state in which luggage boxes are coupled to a vehicle body, inner panels and outer panels are doubly coupled to luggage housings of luggage boxes, and sealing is doubly performed between the vehicle body and the luggage housing.

A panel assembly for vehicles according to embodiments of the present disclosure is a panel assembly for vehicles, in which the panel assembly is coupled to luggage boxes and a vehicle body, the luggage boxes being provided with luggage housings that are disposed in an upper body for the vehicle body to which the upper body and a lower body are coupled, each of which has an opening that is open to a side of the vehicle, and luggage doors which cover openings of the luggage housings. The panel assembly includes an inner panel fastened to the vehicle body formed of a plurality of pipes and connected to the luggage housings of the luggage boxes and an outer panel fastened to the inner panel from an outside, forming an exterior of the vehicle, and connected to the luggage housings of the luggage boxes. The inner panel can be fastened to the vehicle body by bolting, riveting, or fitting, and the outer panel can be fastened to the inner panel by bolting, riveting, or fitting.

The upper body may include a plurality of pillar members that are bent upward, connect sides of the upper body, and are disposed in a longitudinal direction of the vehicle. The luggage boxes may be disposed between the plurality of pillar members, and the inner panel and the outer panel may enclose the pillar members and are connected to the luggage housings.

The inner panel may include a middle inner panel that covers the pillar members disposed between the plurality of luggage boxes and whose ends are connected to the opposite luggage housings, and the outer panel may include outer side panels which are coupled to cover a roof portion of the middle inner panel, which are coupled to cover side portions of the outer roof panel and the middle inner panel whose ends are connected to the luggage housings, and whose ends are connected to the luggage housings.

The outer side panels may be disposed on the side parts adjacent to the openings of the luggage housing.

The outer panel may further include an outer side panel that is disposed at a side portion on a side opposite to the opening of each of the luggage housings and that is formed to cover a whole portion opposite to the openings of the inner panel and the luggage housings.

The inner panel may include front and rear inner panels, which are coupled to enclose roof portions, side portions, and front and rear portions of the pillar members disposed at front and rear ends of the vehicle body, and whose ends are connected to the luggage housings of the luggage boxes, and the outer panel may further include rear outer panels, which are coupled to enclose the front inner panel, whose ends are coupled to enclose a front outer panel and a rear inner panel connected to the luggage housings of the luggage boxes, and whose ends are connected to the luggage housings of the luggage boxes.

The front and rear inner panels may be formed in the same shape, and each of the front and rear inner panels may be formed into first and second parts, both of which are coupled to overlap with each other.

The inner panel may include longitudinal inner panels which are formed in a pair to extend in a longitudinal direction of the vehicle and which connect sides of the front inner panel and the rear inner panel, and the outer panel may include a longitudinal outer panel which is coupled outside the longitudinal inner panel and which covers sides of the longitudinal inner panel and the lower body.

The inner panel may be disposed between the front and rear inner panels and may have an arcuate panel shape in which a middle portion thereof protrudes upward. The inner panel may further include a middle inner panel, whose opposite ends are coupled to the longitudinal inner panels, respectively. The longitudinal inner panels may connect the front and rear inner panels, which are formed of first and second parts and are coupled such that the two parts overlap each other. Thereby, the inner panels can form an organic annular structure.

The front and rear outer panels may have the same shape so as to be symmetric with respect to each other in a forward/rearward direction, and the front and rear outer panels may include first and second outer panels, wherein the first outer panel, which is loaded above the front and rear inner panels, is coupled to enclose upper and side portions of the front and rear inner panels and has the first assembly portion formed at a front side end of the vehicle, and the second outer panel is coupled to enclose a front of the front inner panel and a rear of the rear inner panel and has a second assembly portion coupled to the first assembly portion at an end corresponding to the first assembly portion.

The first and second assembly portions may be coupled by fitting.

The inner panel may further include an auxiliary inner panel that connects the front inner panel or the rear inner panel and is connected to the upper body.

Embodiments of the present disclosure can solve problems in the art, and the inner panel assembly for a vehicle according to embodiments of the present disclosure has an effect that can prevent external foreign materials from penetrating into a vehicle body by doubly sealing a space between a vehicle body and the luggage housings when an inner panel and an outer panel are doubly coupled to luggage housings of luggage boxes in a state in which the luggage boxes are coupled to a vehicle body.

Further, the panels are coupled to each other by fitting and are coupled to the vehicle body by bolting or riveting. This assembling method has an effect that can simplify a manufacturing process and thus minimize manufacturing costs by manufacturing and transporting each panel to a smart factory, and by a simple coupling method such as fitting, bolting, or riveting at a smart factory with no manufacturing process such as a pressing process or a painting process.

Further, by forming an organic annular structure that prevents a front inner panel, a rear inner panel, a longitudinal inner panel, and an intermediate inner panel from separating from each other, there is an effect of improving assembly rigidity of the inner panel assembly without adding separate coupling members through this coupling structure.

Further, by coupling the outer panel with the inner panel from the outside of the inner panel by fitting with the inner panel, there is an effect of simplifying the manufacturing processes and reducing manufacturing costs.

BRIEF DESCRIPTION OF THE DRAWINGS

The above and other objectives, features, and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Figure 1:
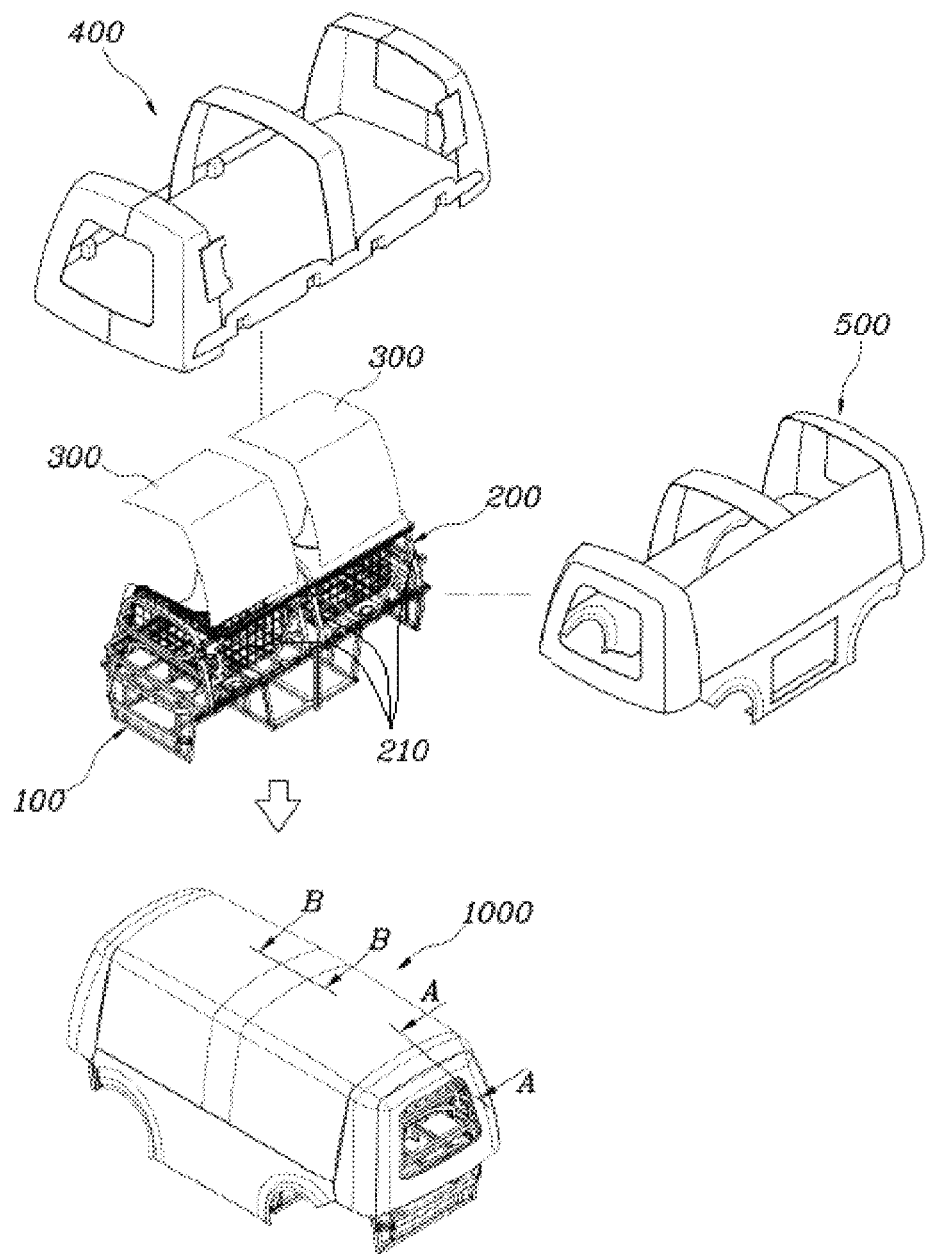
FIG. 1 is a view illustrating a manner in which a luggage box of a panel assembly for a vehicle according to an embodiment of the present disclosure is coupled to a vehicle body.

Hereinafter, embodiments of the present disclosure will be described in detail with reference to the accompanying drawings. The terminologies or words used in the specification and the appended claims of the present disclosure should not be interpreted as being limited merely to common and dictionary meanings. On the contrary, they should be interpreted on the basis of the meanings and concepts of embodiments of the present disclosure in compliance with the scope of the present disclosure on the basis of the principle that the inventor(s) can appropriately define the terms in order to describe the present disclosure in the best manner.

Accordingly, as embodiments explained in this description and the configurations illustrated in the drawings only suggest a most preferred embodiment and do not present all of the technical spirit of the present disclosure, it must be understood that diverse equivalences and modifications that can replace them were possible at the time at which the invention was made.

Terms including ordinal numbers such as first, second, and the like used herein may be used to describe various components, but the various components are not limited by these terms. The terms are used only for the purpose of distinguishing one component from another component, for example, without departing from the scope of rights in accordance with the inventive concept, and the first component may be called a second component. Similarly, the second component may also be referred to as the first component.

It will be understood that when a component is referred to as being "coupled to" or "connected to" another component, it can be directly on, connected to or coupled to the other element, or intervening elements may be present therebetween. In contrast, when a component is referred to as being "directly coupled to" or "directly connected to" another element, there are no intervening elements present. The other expressions that describe a relationship between components, such as "between" and "immediately between," or "adjacent to" and "directly adjacent to" should be interpreted in this manner as well.

The terms used herein are used only to explain specific embodiments, but are not intended to limit the present disclosure. The expression of the singular in the specification includes the meaning of the plural unless the meaning of the singular is definitely different from that of the plural in the context. It should be understood that, in the following description, the term "include" or "have" may represent the existence of a feature, a number, a step, an operation, a component, a part, or a combination thereof, and may not, in advance, exclude the existence or addition of another feature, another number, another step, another operation, another component, another part or a combination thereof.

Unless otherwise defined, all terms used herein, including technical or scientific terms, have the same meaning as commonly understood by those having ordinary skill in the art. Terms as defined in commonly used dictionaries should be construed as having meanings consistent with the meanings in the context of the related art, and shall not be construed in ideal or excessively formal manners unless expressly defined herein.

Hereinafter, exemplary embodiments of the present disclosure will be described with reference to the attached drawings, and thereby the present disclosure will be described in detail. The same reference number suggested in each drawing indicates the same member.

Relatively long manufacturing processes and manufacturing expenses are required to provide vehicles with all of a suspension, an exterior, an interior, a steering system, a safety system, etc. in consideration of driving comfort, safety specification, aesthetic appearance, driving performance, etc., for passengers. In addition, since individual vehicles should be manufactured for respective uses, there is a problem in that the vehicles are not manufactured to be suitable for use in a customized manner.

The vehicles to which technology based on embodiments of the present disclosure is applied relate to business vehicles having various commercial purposes, such as physical distribution, food trucks, delivery, servicing, and so on, among purpose built vehicles (PBVs). In the case of the illustrated embodiments, illustrated is a vehicle which can be driven by an autonomous driving system with only goods loaded in an internal space for transportation, and which is used for unattended delivery/physical distribution/delivery systems of freights or foods.

The vehicle based on embodiments of the present disclosure is simplified in structure, so that design and manufacturing processes thereof can be simplified. Parts for this vehicle are modularized and made for common use, thereby saving costs and facilitating supply and demand of the parts. Modularized parts for this vehicle have an advantage in that the vehicle can be completed simply by mechanical coupling such as bolting or riveting through a pressing process, a process of welding a vehicle body, and an eco-friendly environment smart factory production process without a painting process.

Embodiments of the present disclosure relate to a structure in which outer plates and luggage boxes are coupled to a vehicle body using a plurality of pipes in order to simplify the manufacturing process, to exclude a welding process as much as possible, and to reduce manufacturing costs for vehicle body members. However, in the case of the pipe, the pipe can be manufactured through extrusion, roll forming, etc., and has an advantage in that the manufacturing costs thereof are low, but it is necessary for reinforcement of coupling strength when ends of the pipes are coupled to other pipes or panels. Therefore, in the case of embodiments of the present disclosure, a coupling member 20 for closing an open end of the pipe is applied to allow an end of the pipe to be strongly coupled to another pipe or panel, and in order to allow an end of the pipe to be strongly coupled to another pipe or panel, a coupling member 20 for closing an open end of the pipe is applied, and a coupling surface 21, in which coupling holes 21a, for suppressing deformation of the end of the open pipe through the coupling member 20 and for providing coupling to another component, are formed, can be designed to be provided.

Figure 7:
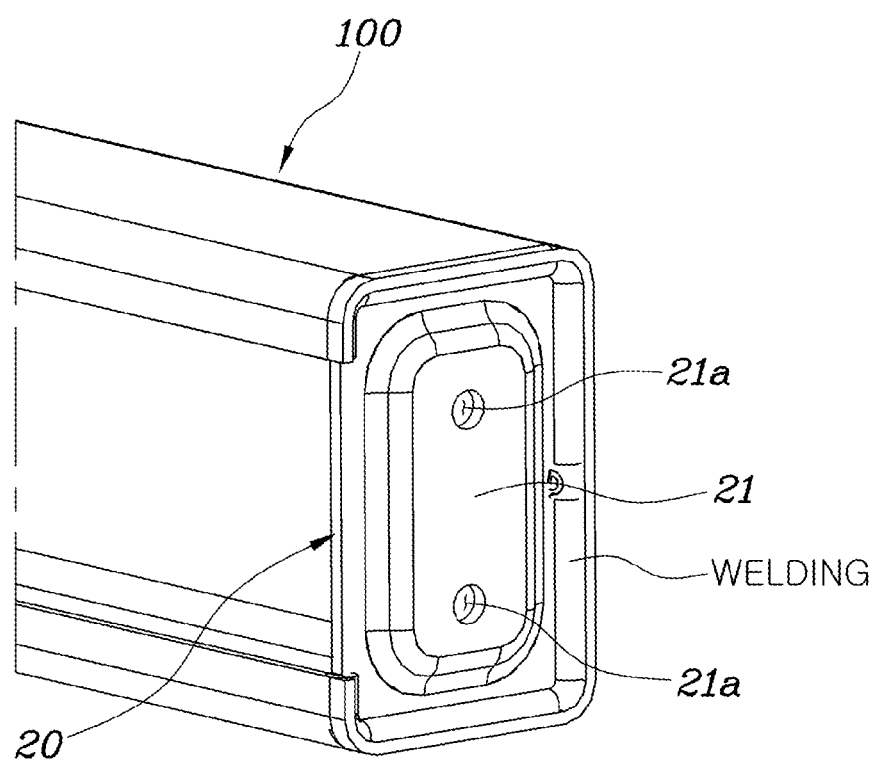
FIG. 7 is a view illustrating a manner in which a coupling member is coupled to an end of a pipe of the vehicle body according to an embodiment of the present disclosure.

FIG. 7 is a view illustrating a manner in which a coupling member is coupled to an end of the pipe of the vehicle body in an embodiment of the present disclosure. As illustrated in FIG. 7, the coupling member 20 is welded at a distance separated inwardly from the end of the pipe in a lengthwise direction of the pipe, and weld beads are formed in a separated space in which the coupling member 20 is formed by inward separation from the pipe. Thereby, finishing work of the weld beads can be excluded, and thus integrating work of the coupling member 20 can be simplified. According to embodiments of the present structure in which the pipe and the coupling member 20 are integrated, there is an advantage in that the vehicle body can be easily assembled simply by mechanical coupling such as bolting or riveting at an eco-friendly smart factory, is eco-friendly due to the lack of necessity of welding or the like, some members of the vehicle body can be easily exchanged after being in an accident or when being repaired or maintained, and a variety of vehicles can be easily assembled and produced.

The vehicle to which embodiments of the present invention is applied may be divided into a business region on which freight is loaded and a drive region for vehicle driving. The business region may be variously changed according to customer demand, and the drive region may be variously changed according to a drive condition of the vehicle.

In the illustrated embodiments, the vehicle is basically designed to have a structure in which a space in which a door is opened only on one side and freight can be loaded is opened, and the business region may be designed in various shapes according to customer demand.

Figure 2:
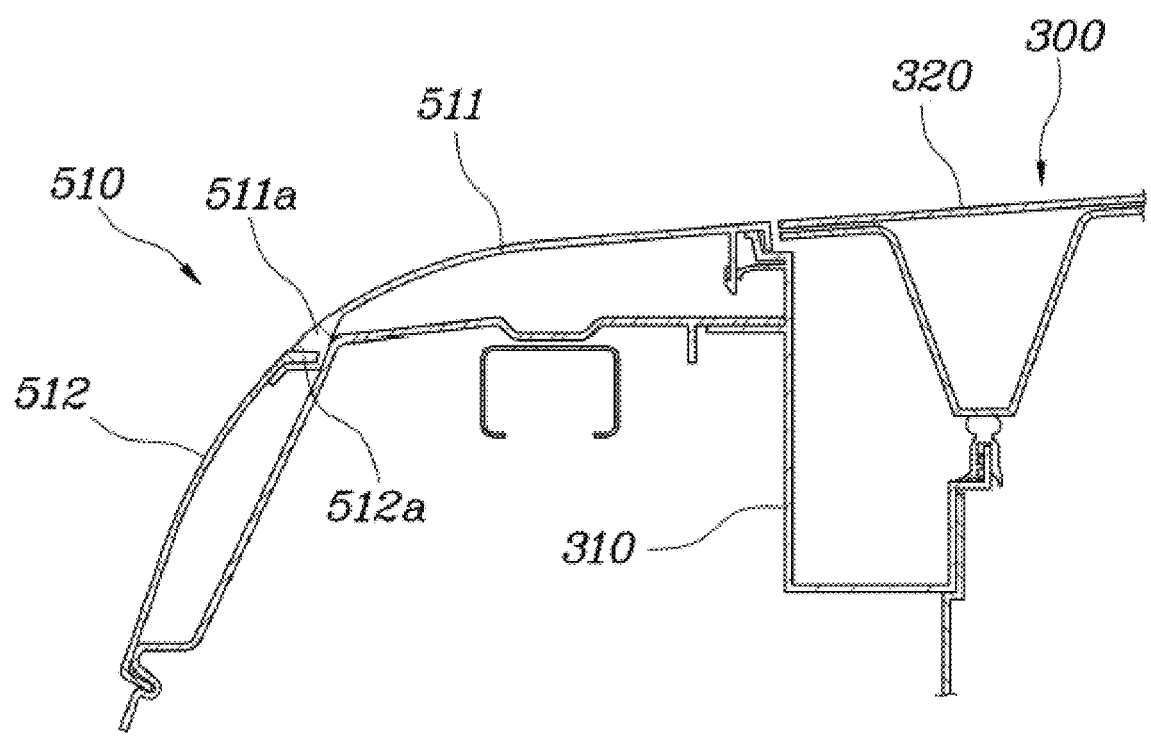
FIG. 2 is a cross-sectional view taken along line A-A of FIG. 1.
Figure 3:
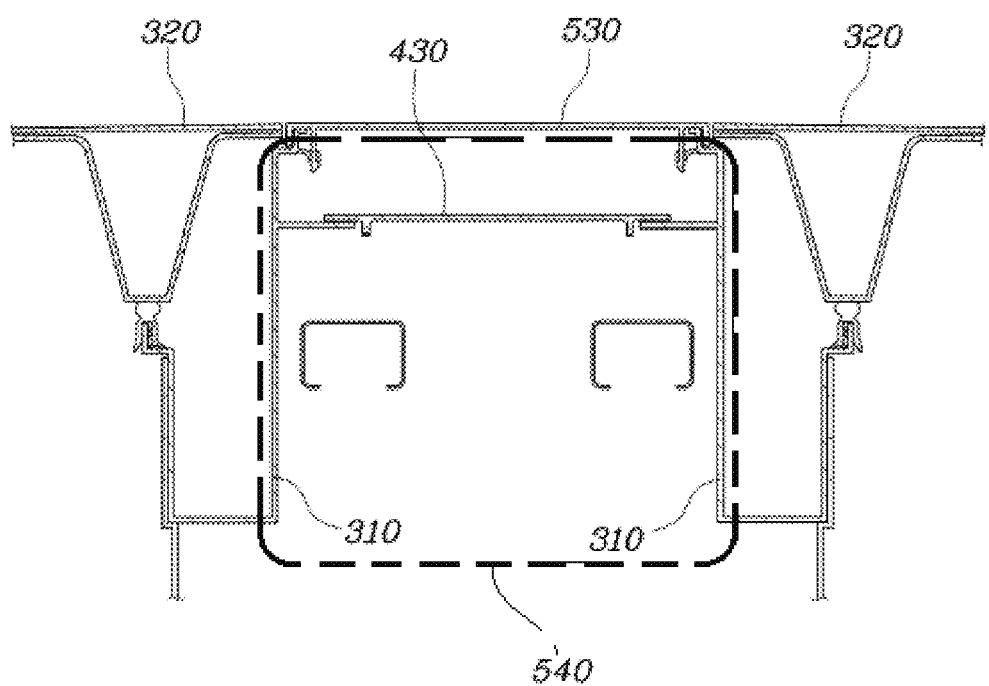
FIG. 3 is a cross-sectional view taken along line B-B of FIG. 1.
Figure 4:
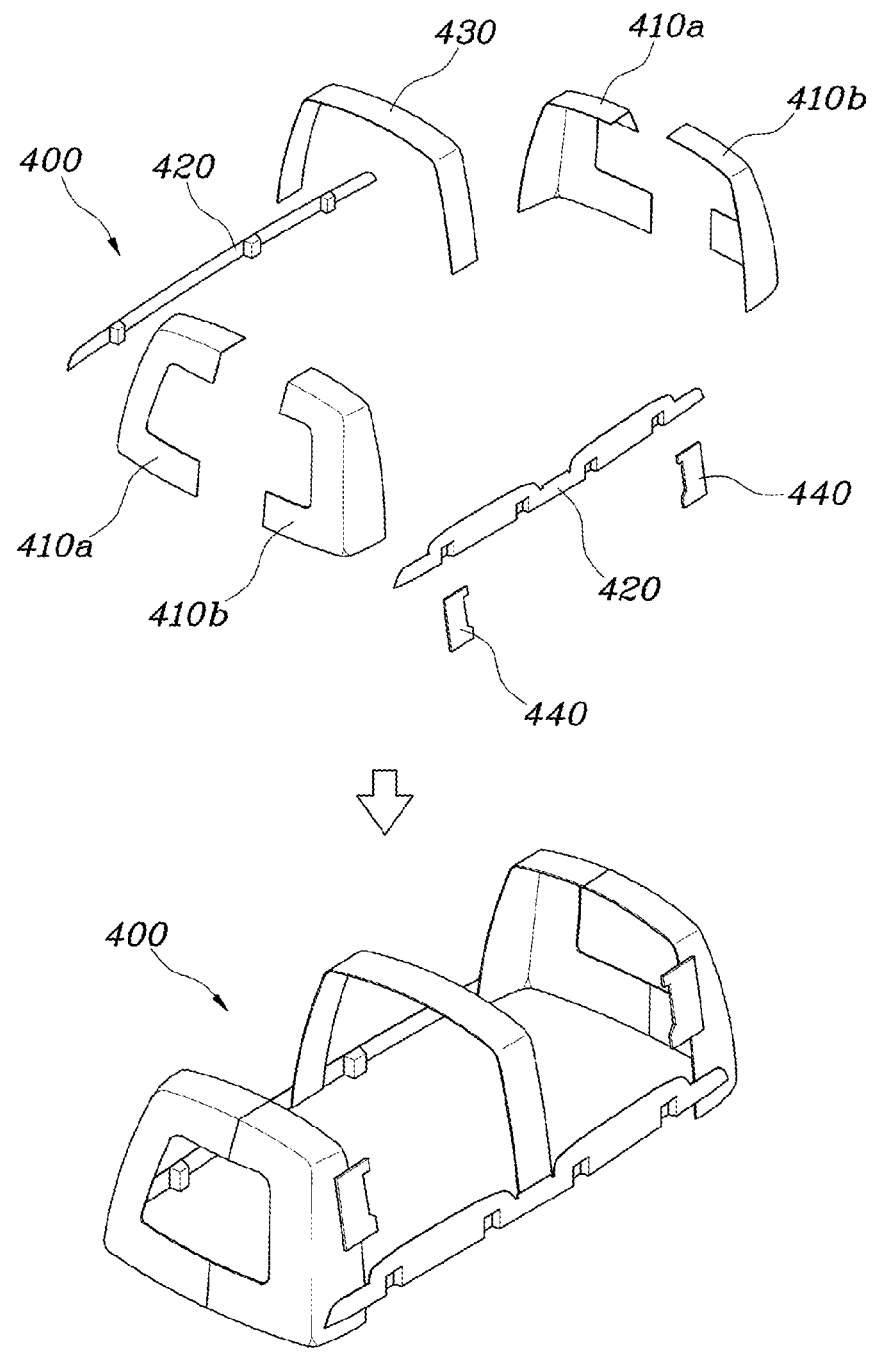
FIG. 4 is a perspective view illustrating an inner panel of the panel assembly for a vehicle according to an embodiment of the present disclosure.
Figure 5:
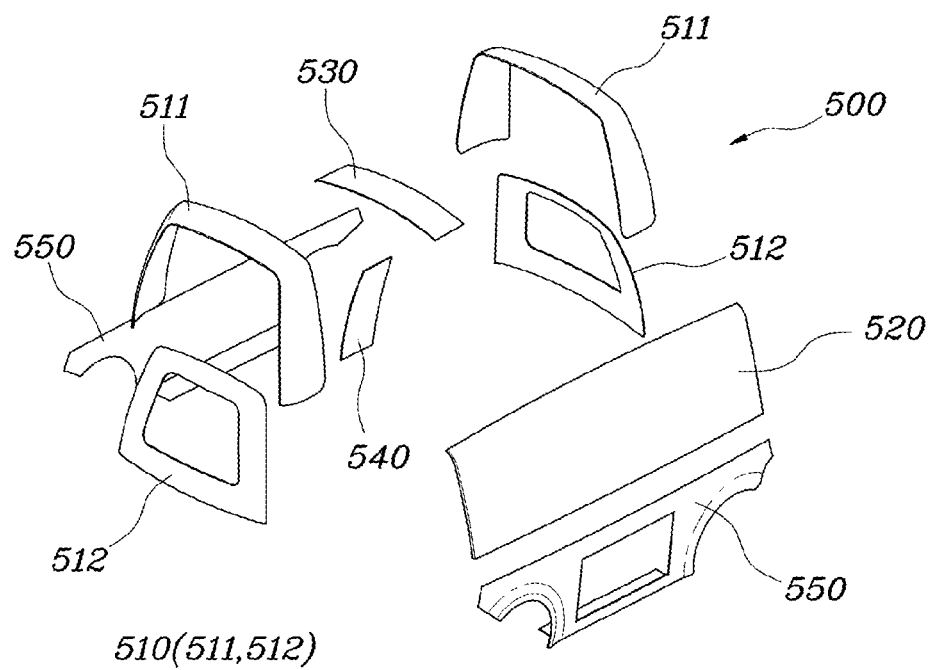
FIG. 5 is a perspective view illustrating an outer panel of the panel assembly for a vehicle according to an embodiment of the present disclosure.
Figure 5:
Figure 5:
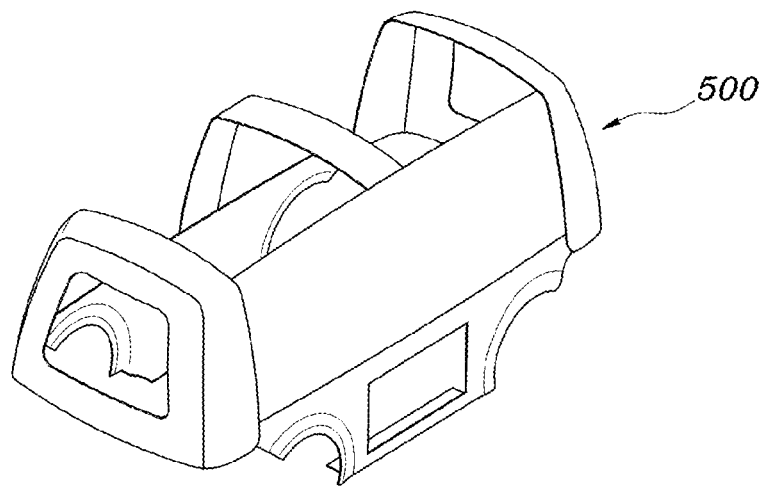
Figure 6:
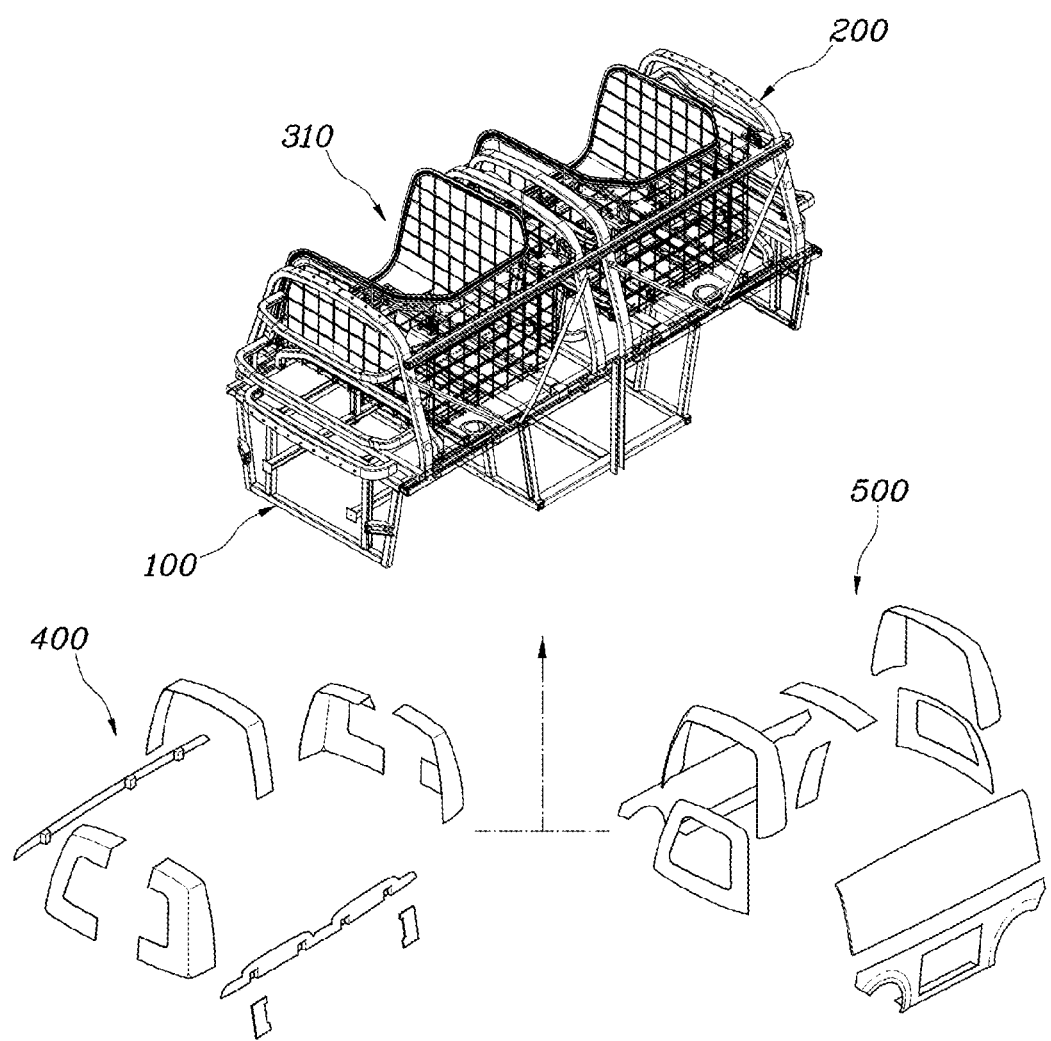
FIG. 6 is a view illustrating a manner in which the panel assembly of the vehicle according to an embodiment of the present disclosure is coupled to a luggage housing.

FIG. 1 is a view illustrating a manner in which a luggage box 300 of a panel assembly for a vehicle according to an embodiment of the present disclosure is coupled to a vehicle body. FIG. 2 is a cross-sectional view taken along line A-A of FIG. 1. FIG. 3 is a cross-sectional view taken along line B-B of FIG. 1. FIG. 4 is a perspective view illustrating an inner panel 400 of the panel assembly for a vehicle according to an embodiment of the present disclosure. FIG. 5 is a perspective view illustrating an outer panel 500 of the panel assembly for a vehicle according to an embodiment of the present disclosure. FIG. 6 is a view illustrating a manner in which the panel assembly of a vehicle according to an embodiment of the present disclosure is coupled to a luggage housing.

A panel assembly for a vehicle according to an exemplary embodiment of the present invention will be described with reference to FIGS. 1 to 6.

The panel assembly for a vehicle according to embodiments of the present invention is a panel assembly which is coupled to a vehicle body together with an upper body 200 and a luggage box 300. The luggage box 300 includes a luggage housing 310 that is disposed in the upper body 200 to which a lower body wo is coupled and whose openings are opened toward sides of the vehicle and luggage doors 320 that are coupled to the openings of the luggage housing 310. The panel assembly further includes an inner panel 400 which is fastened to the vehicle body formed of a plurality of pipes and which is coupled to the luggage housing 310 of the luggage box 300 and an outer panel 500 that is fastened to the inner panel 400 from the outside, forms the outside of the vehicle, and is connected to the luggage housing 310. The inner panel 400 can be fastened to the vehicle body by bolting, riveting, or fitting, and the outer panel 500 can be fastened to the inner panel 400 by bolting, riveting, or fitting.

The vehicle body of the vehicle may be formed in such a manner that the lower body 100 located below and the upper body 200 are coupled to each other. In the lower body 100, a suspension system, a driving system, or a battery, which relates to driving of the vehicle may be mounted at a lower portion of the vehicle. The upper body 200 is mounted on an upper portion of the lower body 100, and may form a loading space in which freight is loaded.

The luggage housing 310 of the luggage box 300 may be coupled to the upper body 200 so as to be open to one side of the vehicle. Through at least one opening, the freight can be loaded into the luggage housing 310.

The side of the vehicle at which the opening is located may be disposed toward a sidewalk on an ordinary driving road.

In the Republic of Korea or the U.S.A., in the case of the right-lane road on which the vehicles travel on the right side of the road, the opening may be disposed on the right side of the vehicle. In Japan or the United Kingdom, in the case of the left-lane road on which the vehicles travel on the left side of the road, the opening may be disposed on the left side of the vehicle.

As a result, any customer can easily input or output his/her freight at the luggage housing 310 on the side of the sidewalk.

Further, the other side of the luggage housing 310, at which no opening is disposed, may be formed in a closed state, and a position of the opening or the number of luggage boxes 300 may be changed according to a request of the customer.

In addition, each of the luggage boxes 300 may be provided with a luggage door 320 that is coupled to be rotatable in an upward/downward direction in order to cover the opening of the luggage housing 310.

In one embodiment of the present disclosure, it is illustrated that two luggage boxes 300 are mounted on the upper body 200, and the openings of the two luggage boxes 300 are disposed in the same direction.

As illustrated in FIG. 6, the luggage housing 310 of the luggage box 300 may be first coupled to the upper body 200, and then the inner panel 400 and the outer panel 500 may be coupled.

The inner panel 400 may be coupled to the upper body 200 and may be mounted to be connected to the luggage housing 310 of the luggage box 300 coupled to the upper body 200.

Thereby, it is possible to improve a fastening force of the luggage box 300 coupled to the upper body 200 and to prevent external foreign materials from intruding into the vehicle body.

The outer panel 500 may be coupled outside the inner panel 400 to form an enclosure of the vehicle and may be coupled to the inner panel 400 through fitting. Further, as the outer panel 500 is disposed to be coupled to the luggage housing 310 of the luggage box 300, the inner panel 400 and the outer panel 500 can be doubly connected to the luggage housing 310.

Thereby, it is possible to prevent external foreign materials from intruding into the vehicle or to prevent moisture from intruding into the vehicle body due to a weather condition such as rainfall or snowfall.

Further, the inner panel 400 is coupled to the vehicle body by bolting, riveting, or fitting, and the outer panel 500 encloses the inner panel 400 at the outside of the inner panel 400 and can be coupled to the inner panel 400 by fitting or bolting.

Thereby, both the inner panel 400 and the outer panel 500 can be manufactured and assembled at a smart factory where only mechanical coupling is used, without complicated processes such as a pressing process, a welding process, and a sheet metal plating process.

The upper body 200 includes a plurality of pillar members 210, each of which is bent upward, connects the side of the upper body 200, and is disposed in a longitudinal direction of the vehicle. The plurality of luggage boxes 300 are disposed between the plurality of pillar members 210. The inner panel 400 and the outer panel 500 may enclose the pillar members 210 and may be connected to the luggage housing 310.

As illustrated in FIG. 1, the pillar members 210 included in the upper body 200 may be formed in an inverted U shape such that ends thereof connect both sides of the upper body 200 and are bent to protrude upward. Accordingly, the pillar members 210 may simultaneously form pillar portions on both sides of the vehicle and a roof portion of the vehicle.

These pillar members 210 may be disposed on the upper body 200 in plural in the longitudinal direction of the vehicle. The luggage boxes 300 are disposed between the plurality of pillar members 210, and the luggage housings 310 of the luggage boxes 300 may be coupled to the pillar members 210 and fixed to the vehicle body.

As illustrated in FIG. 1, the inner panel 400 may be coupled to the upper body 200 so as to surround the pillar members 210 of the vehicle. The inner panel 400 surrounding the pillar members 210 may be coupled to the pillar members 210, and ends thereof may be connected to the luggage housings 310 of the luggage boxes 300.

Thereby, a space between the pillar member 210 and the luggage box 300 can be sealed. Further, there is an effect of strongly maintaining a coupling force between the luggage box 300 and the upper body 200 by connecting the pillar members 210 and the luggage boxes 300.

Further, the outer panel 500 is coupled to the inner panel 400 so as to enclose the outside of the inner panel 400, and ends thereof are connected to the luggage housings 310 of the luggage boxes 300, so that it is possible to prevent foreign materials from penetrating into the vehicle body by doubly sealing connection parts of the luggage boxes 300 connected to the pillar members 210.

Hereinafter, an embodiment of the inner panel 400 enclosing the pillar members 210 will be described.

The inner panel 400 includes a middle inner panel 430 which covers the pillar members 210 disposed between the plurality of luggage boxes 300 and whose ends are connected to the luggage housings 310 of both of the luggage boxes 300. The outer panel 500 may include an outer roof panel 530 which is coupled to cover a roof portion of the middle inner panel 430 and whose ends are connected to the luggage housings 310 of the luggage boxes 300 and outer side panels 540 which are coupled to cover side parts of the middle inner panel 430 and whose ends are connected to the luggage housings 310 of the luggage boxes 300.

The outer panel 500 may include an outer roof panel 530 which is coupled to cover the roof portion of the middle inner panel 430 and whose ends are connected to the luggage housings 310 of the luggage boxes 300, and an outer side panel 540 which is coupled to cover a side portion of the middle inner panel 430 and whose ends are connected to the luggage housings 310 of the luggage boxes 300.

As illustrated in FIGS. 1 and 3, the plurality of luggage boxes 300 may be disposed at both sides of the pillar members 210, and the middle inner panel 430 may be formed at the inner panel 400 so as to be coupled to the pillar members 210 between the luggage housings 310.

The middle inner panel 430 is loaded from upside to downside and surrounds the whole pillar members 210 and may be coupled to the pillar members 210 such that opposite ends thereof are connected to the luggage housings 310 of the opposite luggage boxes 300.

Further, the outer panel 500 is provided with an outer roof panel 530 that is coupled to the roof portion of the middle inner panel 430 so as to enclose the roof portion of the middle inner panel 430. The outer roof panel 530 may be connected to upper portions of the luggage housings 310 of the luggage boxes 300. The outer panel 500 is provided with an outer side panel 540 that is coupled to the side portion of the middle inner panel 430 so as to enclose the side portion of the middle inner panel 430. The outer side panel 540 may be connected to the side portions of the luggage housings 310 of the luggage boxes 300.

Thereby, the middle inner panel 430 connects upper and lateral surfaces of the plurality of luggage boxes 300. The outer roof panel 530 and the outer side panel 540 connect upper and lateral surfaces of the luggage housing 310 to perform double sealing. Further, there is an effect that can improve rigidity by interconnecting the plurality of luggage housings 310.

The outer side panel 540 may be disposed at a side portion adjacent to the openings of the luggage housings 310. The outer panel 500 may further include an outer side panel 520 that is formed to cover the whole side opposite to the openings of the inner panel 400 and the luggage boxes 300.

In embodiments of the present disclosure, the plurality of luggage housings 310 may be disposed to be open only to one side of the vehicle. The inner panel 400 and the outer side panel 520 coupled to the vehicle body are provided to enclose all other sides of the plurality of luggage housings 310, so that the whole other side of the vehicle with no openings can be covered simultaneously.

Further, the outer side panel 540 is located on a side on which the opening is located, and has an effect of sealing outside of the luggage door 320 in contact with the luggage door 320 that covers the opening.

The inner panel 400 includes front and rear inner panels 410, which are coupled to enclose a roof portion, side portions, a front portion, and a rear portion disposed at front and rear ends of the vehicle body, and whose ends are connected to the luggage housings 310 of the luggage boxes 300. The outer panel 500 is coupled to enclose the front inner panel 410 whose ends are coupled to enclose a front outer panel 510 and the rear inner panel 410 whose ends are connected to the luggage housings 310 of the luggage boxes 300. The outer panel 500 may further include the rear outer panel 510 whose ends are connected to the luggage housings 310 of the luggage boxes 300.

As illustrated in FIGS. 1, 3, 4 and 5, the pillar members 210 may be disposed in the front and rear of the vehicle. The inner panel 400 is provided with the front and rear inner panels 410 that are connected to the luggage housings 310 of the luggage boxes 300 while enclosing the pillar members 210 disposed in the front and rear of the vehicle. The outer panel 500 may be provided with the rear outer panel 510 that encloses the front inner panel 410, encloses the front outer panel 510 and the rear inner panel 410 that are connected to ends of the luggage housings 310 of the luggage boxes 300, and is connected to ends of the luggage housings 310 of the luggage boxes 300.

Thereby, there is an effect of being doubly sealed by connecting the upper surfaces and the sides of the pillar members 210 and the luggage boxes 300 disposed in the front and rear. Further, the front and rear inner panels 410 have an effect of covering the front and rear of the pillar members 210 and being able to protect the luggage boxes 300 from external impacts.

The front and rear inner panels 410 are formed to have the same shape, and are each formed of a first part 410a and a second part 410b, both of which can be coupled to overlap each other.

The front and rear inner panels 410 are formed in the same shape, and may be disposed to be symmetrical with respect to each other in a forward/rearward direction. Thereby, when the front inner panel 410 and the rear inner panel 410 are manufactured, there is an effect of reducing manufacturing costs and simplifying a manufacturing process.

Further, the front and rear inner panels 410 are coupled to the pillar members 210 in an overlapped state such that two parts divided into a first part 410a and a second part 410b are coupled to allow ends thereof to overlap each other, and thereby a coupling force to the pillar members 210 is improved. Further, there is an effect that the front and rear inner panels 410 having a three-dimensional shape can be more easily manufactured.

The inner panel 400 includes longitudinal inner panels 420 that are formed in a pair to extend in the longitudinal direction of the vehicle and that connect sides of the front and rear inner panels 410. The outer panel 500 may include a longitudinal outer panel 550 that is coupled outward from the longitudinal inner panels 420 and covers sides of the longitudinal inner panels 420 and the lower body 100.

As illustrated in FIGS. 1, 4 and 5, the longitudinal inner panels 420 are provided in a pair to extend to connect lower portions of the front and rear inner panels 410 of the vehicle, and the longitudinal outer panel 550 may be coupled to the longitudinal inner panel 420 in a locked state and may extend downward to cover the side of the lower body 100.

Thereby, the longitudinal outer panel 550 and the longitudinal inner panel 420 cover a lower portion of the side of the vehicle and have a sealing effect by connection with the lower portions of the luggage boxes 300.

The inner panel 400 is disposed between the front and rear inner panels 410 and has an arcuate panel shape in which a middle portion thereof protrudes upward. The inner panel 400 further includes a middle inner panel 430, whose opposite ends are coupled to the longitudinal inner panels 420, respectively. The longitudinal inner panels 420 connect the front and rear inner panels 410, which are formed of first and second parts 410a and 410b and are coupled such that the two parts thereof overlap. Thereby, the inner panels 400 can form an organic annular structure.

As illustrated in FIG. 4, the front and rear inner panels 410 have a shape in which two panels are coupled. The two panels, i.e., the front and rear inner panels 410 are disposed to correspond to each other in a diagonal direction. The ends of the longitudinal inner panels 42o are coupled to overlap outward of the front and rear inner panels 410, and the middle inner panel 430 is coupled to overlap with the longitudinal inner panels 420 from the outside. Thereby, it is possible to form an organic annular structure in which the front inner panel 410, the rear inner panel 410, the longitudinal inner panels 420, and the middle inner panel 430 are prevented from being separated from each other.

Through this coupling structure, there is an effect of improving assembly rigidity of the assembly of the inner panels 400 without adding separate coupling members.

The front and rear outer panels 510 have the same shape so as to be symmetrical in the forward/rearward direction. The front and rear outer panels 510 may include a first outer panel 511 which is loaded above the front and rear inner panels 410, is coupled to enclose upper and side portions of the front and rear inner panels 410, and has a first assembly portion 511a formed at the front end of the vehicle, and a second outer panel 512 which is coupled to enclose the front of the front inner panel 410 and the rear of the rear inner panel 410, and has a second assembly portion 512a coupled to the first assembly portion 511a at an end corresponding to the first assembly portion 511a.

The front and rear outer panels 510 have the same shape so as to be symmetrical in the forward/rearward direction. The front and rear inner panels 410 are formed to have the same shape and may be disposed to be symmetrical with respect to each other in a forward/rearward direction. Thereby, when the front inner panel 410 and the rear inner panel 410 are manufactured, there is an effect that can reduce manufacturing costs and simplify a manufacturing process.

Further, as illustrated in FIG. 2, the front and rear outer panels 510 are provided with the first outer panel 511, which is loaded from above to below the front and rear inner panels 410 and then is coupled to the front and rear inner panels 410. The ends of the first outer panel 511 are coupled to the luggage housings 310 of the luggage boxes 300, so that the front and rear portions of the luggage boxes 300 can be doubly sealed together with the front inner panels 410.

The second outer panels coupled forward and backward to the first outer panels 511 located in the front and rear of the vehicle are provided, so that a three-dimensional shape can be easily realized.

Further, by relieving front and rear impacts of the luggage boxes 300 in the event of a head-on or rear-end collision of the vehicle, there is an effect that can protect freight loaded in the luggage boxes 300.

The first assembly portion 511*a* and the second assembly portion 512*a* can be coupled to each other by fitting.

As illustrated in FIG. 2, the first assembly portion 511*a* is provided at an end of the first outer panel 511, and the second assembly portion 512*a* fastened to the first assembly portion 511*a* is provided at a position at which the second outer panel 512 comes into contact with the first outer panel 511. The first and second assembly portions 511*a* and 512*a* may be coupled to each other by fitting.

Thereby, in comparison with a coupling method using welding or an adhesive, the first and second assembly portions 511*a* and 512*a* are fastened, so that the manufacturing process can be simplified.

Further, as the first and second assembly portions 511*a* and 512*a* are coupled to each other, external foreign materials can be prevented from penetrating into the inner panel 400 by forming a seal between the first outer panel 511 and the second outer panel 512.

The inner panel 400 may further include an auxiliary inner panel 440 connecting the upper body 200 to the front or rear inner panel 410.

As illustrated in FIG. 4, the auxiliary inner panel 440 is disposed on a side with no opening and may connect the front or rear inner panel 410 with the vehicle body.

Thereby, there is an effect in which the auxiliary inner panel 440 can improve rigidity between the front or rear inner panel 410 and the vehicle body.

Although the present disclosure is illustrated and described in relation to specific embodiments, the present disclosure can be modified and changed without departing from the technical idea thereof, which will be apparent to those having ordinary knowledge in the field of art to which the present disclosure belongs.

What is claimed is:

1. A panel assembly for a vehicle that comprises a vehicle body that includes a plurality of pipes, the vehicle body comprising an upper body coupled to a lower body, the panel assembly comprising:
   an inner panel fastened to the vehicle body and connected to luggage housings of luggage boxes disposed in the upper body of the vehicle body, the luggage boxes each having an opening open to a side of the vehicle and a luggage door configured to cover the opening; and
   an outer panel fastened to the inner panel from an outside, defining an exterior of the vehicle, and connected to the luggage housings of the luggage boxes;
   wherein the inner panel comprises a middle inner panel covering pillar members disposed between the luggage boxes;
   wherein edges of the middle inner panel are connected to opposite ones of the luggage housings;
   wherein the outer panel comprises outer side panels coupled to cover a side portion of the middle inner panel and to cover a side portion of an outer roof panel, respectively; and
   wherein ends of the outer side panels are connected to the luggage housings, respectively.

2. The panel assembly according to claim 1, wherein the outer panel further includes an outer side panel that is disposed at a side portion opposite to the opening of each of the luggage boxes, and that is formed to cover a portion opposite to openings of the inner panel and the luggage housings.

3. The panel assembly according to claim 1, wherein:
   the inner panel is fastened to the vehicle body by bolting, riveting, or fitting; and
   the outer panel is fastened to the vehicle body by bolting, riveting, or fitting.

4. The panel assembly according to claim 1, wherein the inner panel is fastened to the vehicle body by bolting.

5. The panel assembly according to claim 1, wherein the inner panel is fastened to the vehicle body by riveting.

6. The panel assembly according to claim 1, wherein the inner panel is fastened to the vehicle body by fitting.

7. A vehicle comprising:
   a vehicle body comprising a plurality of pipes, the plurality of pipes defining an upper body coupled to a lower body, wherein the upper body comprises a plurality of pillar members that are bent upward, connect sides of the upper body, and are disposed in a longitudinal direction of the vehicle;
   luggage boxes disposed in the upper body of the vehicle body between the plurality of pillar members, each of the luggage boxes comprising a luggage housing and having an opening open to a side of the vehicle and a luggage door configured to cover the opening;
   an inner panel fastened to the vehicle body and connected to the luggage housings of the luggage boxes, the inner panel comprising front and rear inner panels coupled to enclose roof portions, side portions, and front and rear portions of the pillar members disposed at front and rear ends of the vehicle body; and
   an outer panel fastened to the inner panel from an outside, defining an exterior of the vehicle, and connected to the luggage housings of the luggage boxes, the outer panel comprising front outer panels coupled to enclose the front inner panel and having ends coupled to the luggage housings of the luggage boxes and a rear outer panel connected to the luggage housings of the luggage boxes, the ends being connected to the luggage housings of the luggage boxes; and
   wherein the inner panel and the outer panel enclose the pillar members and are connected to the luggage housings.

8. The vehicle according to claim 7, wherein the front and rear inner panels have a same shape, and each of the front and rear inner panels comprises first and second parts, the first and second parts being coupled to overlap with each other.

9. The vehicle according to claim 7, wherein the inner panel comprises a pair of longitudinal inner panels extending in the longitudinal direction of the vehicle and connecting sides of the front inner panel and the rear inner panel.

10. The vehicle according to claim 9, wherein the outer panel comprises a longitudinal outer panel coupled outside the longitudinal inner panels and covering sides of the longitudinal inner panel and the lower body.

11. The vehicle according to claim 10, wherein the inner panel further comprises a middle inner panel provided between the front inner panel and the rear inner panel, and wherein a central portion of the middle inner panel protrudes upward and opposite ends of the middle inner panel are coupled to the longitudinal inner panel.

12. The vehicle according to claim 11, wherein the front and rear inner panels each comprise first and second parts that are coupled to overlap with each other, and wherein the front and rear inner panels are connected by the longitudinal inner panel such that the inner panel has an annular structure.

13. The vehicle according to claim 7, wherein the front and rear outer panels have a same shape so as to be symmetric with respect to each other in a forward/rearward direction.

14. The vehicle according to claim 13, wherein:
the front outer panels comprise a first front outer panel and a second front outer panel at a front side of the vehicle;
the rear outer panel comprises a first rear outer panel and the vehicle further comprises a second rear outer panel, the first and second rear outer panels located at a rear side of the vehicle;
the first front outer panel is loaded above the front inner panel and rear inner panels, is coupled to enclose upper and side portions of the front inner panel, and has a first assembly portion provided at a front side end of the vehicle;
the second front outer panel is coupled to enclose a front of the front inner panel and has a second assembly portion coupled to the first assembly portion at an end corresponding to the first assembly portion;
the first rear outer panel is loaded above the rear inner panel, is coupled to enclose upper and side portions of the rear inner panel, and has another first assembly portion provided at a rear side end of the vehicle; and
the second rear outer panel is coupled to enclose a rear of the rear inner panel and has another second assembly portion coupled to the another first assembly portion at an end corresponding to the another first assembly portion.

15. The vehicle according to claim 14, wherein the first and second assembly portions are coupled by fitting.

16. A vehicle comprising:
a vehicle body that includes a plurality of pipes, the vehicle body comprising an upper body coupled to a lower body; and
a panel assembly that comprises an inner panel fastened to the vehicle body and an outer panel fastened to the inner panel from an outside;
wherein the inner panel is connected to luggage housings of luggage boxes disposed in the upper body of the vehicle body, the luggage boxes each having an opening open to a side of the vehicle and a luggage door configured to cover the opening;
wherein the outer panel defines an exterior of the vehicle;
wherein the outer panel is connected to the luggage housings of the luggage boxes;
wherein the inner panel comprises a middle inner panel covering pillar members disposed between the luggage boxes;
wherein edges of the middle inner panel are connected to opposite ones of the luggage housings;
wherein the outer panel comprises outer side panels coupled to cover a side portion of the middle inner panel and to cover a side portion of an outer roof panel, respectively; and
wherein ends of the outer side panels are connected to the luggage housings, respectively.

17. The vehicle according to claim 16, wherein the upper body comprises a plurality of pillar members that are bent upward, connect sides of the upper body, and are disposed in a longitudinal direction of the vehicle.

18. The vehicle according to claim 17, wherein the luggage boxes are disposed between the plurality of pillar members and the inner panel and the outer panel enclose the pillar members and are connected to the luggage housings.

19. The vehicle according to claim 16, wherein the outer panel further includes an outer side panel that is disposed at a side portion opposite to the opening of each of the luggage boxes, and that is formed to cover a portion opposite to openings of the inner panel and the luggage housings.

20. The vehicle according to claim 16, wherein:
the inner panel is fastened to the vehicle body by bolting, riveting, or fitting; and
the outer panel is fastened to the vehicle body by bolting, riveting, or fitting.

* * * * *

UNITED STATES PATENT AND TRADEMARK OFFICE
CERTIFICATE OF CORRECTION

PATENT NO. : 12,365,391 B2
APPLICATION NO. : 17/977394
DATED : July 22, 2025
INVENTOR(S) : Yun et al.

Page 1 of 1

It is certified that error appears in the above-identified patent and that said Letters Patent is hereby corrected as shown below:

In the Claims

In Column 13, in Claim 14, Line 31, delete "panel and rear inner panels," and insert -- panel, --.

Signed and Sealed this
Second Day of September, 2025

Coke Morgan Stewart
*Acting Director of the United States Patent and Trademark Office*